(12) United States Patent
Gigas et al.

(10) Patent No.: US 7,168,848 B2
(45) Date of Patent: Jan. 30, 2007

(54) AXIAL-PUMPING IMPELLER APPARATUS AND METHOD FOR MAGNETICALLY-COUPLED MIXER

(75) Inventors: Bernd Gigas, Churchville, NY (US); Richard Howk, Pittsford, NY (US)

(73) Assignee: SPX Corporation, Charlotte, NC (US)

( * ) Notice: Subject to any disclaimer, the term of this patent is extended or adjusted under 35 U.S.C. 154(b) by 41 days.

(21) Appl. No.: 10/610,593

(22) Filed: Jul. 2, 2003

(65) Prior Publication Data

US 2005/0002275 A1    Jan. 6, 2005

(51) Int. Cl.
*B01F 7/06* (2006.01)
*B01F 5/12* (2006.01)
*B01F 13/08* (2006.01)

(52) U.S. Cl. .................. 366/270; 366/273; 366/343

(58) Field of Classification Search ............... 368/273, 368/274; 366/270, 343, 342, 316, 317, 315
See application file for complete search history.

(56) References Cited

U.S. PATENT DOCUMENTS

| | | | |
|---|---|---|---|
| 889,921 A * | 6/1908 | Franklin | 366/270 |
| 1,420,773 A * | 6/1922 | Stainbrook | 366/274 |
| 2,459,224 A * | 1/1949 | Hendircks | 366/274 |
| 2,495,895 A * | 1/1950 | Hervert | 366/273 |
| 2,506,886 A * | 5/1950 | OKulitch et al. | 416/3 |
| 2,859,020 A * | 11/1958 | Eddy et al. | 366/274 |
| 3,134,549 A * | 5/1964 | Quackenbush et al. | 241/74 |
| 3,207,488 A * | 9/1965 | Brasington | 366/197 |
| 3,279,765 A * | 10/1966 | Sato et al. | 366/273 |
| 3,591,149 A * | 7/1971 | Auler | 261/91 |
| 3,647,324 A * | 3/1972 | Rafferty et al. | 417/420 |
| 4,162,855 A * | 7/1979 | Bender | 366/274 |
| 4,209,259 A * | 6/1980 | Rains et al. | 366/273 |
| 4,472,063 A * | 9/1984 | Eickelmann | 366/129 |
| 4,522,505 A * | 6/1985 | Medd | 366/343 |
| 4,993,841 A * | 2/1991 | Lofgren et al. | 366/274 |
| 5,364,184 A | 11/1994 | Rains | 366/273 |
| 5,378,062 A | 1/1995 | Rains | 366/273 |
| 5,407,272 A * | 4/1995 | Meier | 366/274 |
| 5,470,152 A | 11/1995 | Rains | 366/273 |
| 5,478,149 A * | 12/1995 | Quigg | 366/273 |
| 5,567,672 A | 10/1996 | Terentiev et al. | 505/166 |
| 5,758,965 A | 6/1998 | Gambrill et al. | 366/273 |
| 5,779,359 A | 7/1998 | Gambrill et al. | 366/273 |
| 6,065,865 A * | 5/2000 | Eyraud et al. | 366/273 |
| 6,100,618 A * | 8/2000 | Schoeb et al. | 310/90.5 |
| 6,206,562 B1 * | 3/2001 | Eyraud et al. | 366/273 |
| 6,416,215 B1 | 7/2002 | Terentiev | 366/273 |
| 6,758,593 B1 * | 7/2004 | Terentiev | 366/273 |

(Continued)

FOREIGN PATENT DOCUMENTS

WO    WO 02 31372    4/2002

(Continued)

*Primary Examiner*—Tony G. Soohoo
(74) *Attorney, Agent, or Firm*—Baker & Hostetler LLP

(57) ABSTRACT

An impeller apparatus for use with a magnetically coupled mixer includes in one embodiment an axial-pumping impeller spaced axially apart from a driven magnet by a shaft. In another embodiment the impeller apparatus includes an up-pumping impeller spaced axially apart from a magnetic element by a shaft, the magnetic element cooperates with a superconducting element for levitating the impeller apparatus away from the bottom of the tank and cooperates with a motive device to rotate the impeller.

22 Claims, 7 Drawing Sheets

U.S. PATENT DOCUMENTS

| | | |
|---|---|---|
| 6,854,877 B2 * | 2/2005 | Hoobyar et al. ............ 366/274 |
| 6,971,788 B1 * | 12/2005 | Gringer et al. ............ 366/265 |
| 2001/0039369 A1 | 11/2001 | Terentiev ................... 600/16 |
| 2002/0082173 A1 * | 6/2002 | Terentiev ................... 366/273 |
| 2002/0145940 A1 | 10/2002 | Terentiev ................... 366/273 |
| 2002/0196705 A1 * | 12/2002 | Jersey et al. ............... 366/274 |
| 2004/0047232 A1 * | 3/2004 | Terentiev ................... 366/273 |
| 2004/0218468 A1 * | 11/2004 | Terentiev ................... 366/273 |

FOREIGN PATENT DOCUMENTS

| | | |
|---|---|---|
| WO | WO 02 41484 | 5/2002 |

* cited by examiner

AXIAL-PUMPING IMPELLER APPARATUS AND METHOD FOR MAGNETICALLY-COUPLED MIXER

FIELD OF THE INVENTION

The present invention relates generally to a method and impeller apparatus for use with magnetically-coupled mixers. More particularly, the present invention relates to a method and impeller apparatus for generating axial flow, and preferably upward axial flow, when mixing or pumping fluids in magnetically-coupled mixers.

BACKGROUND OF THE INVENTION

Chemical compounds are typically mixed within an agitator tank containing a rotating impeller. Bottom-mounted magnetically-coupled mixers can be used for such applications. Such mixers typically include an agitator tank having within it an impeller assembly comprised of a plurality of flat, rectangular radial-pumping blades. The agitator tanks also include a magnetic coupler which couples the impeller to a motor located at the exterior of the tank. Magnetic couplers typically contain a drive magnet attached to the motor and a driven magnet connected to the impeller. The magnets are placed in close proximity to each other so that rotation of the drive magnet induces a rotation of the driven magnet impeller. The impeller assembly operates in close proximity to the tank bottom. As a consequence of the impeller's proximity to the bottom of the tank and the use of radial pumping devices, bottom-mounted magnetically-coupled mixers are typically only used in connection with small vessels for minor mixing duty. Examples of such bottom-mounted magnetically-couple mixers can be found in U.S. Pat. Nos. 5,364,184, 5,378,062, 5,470,152, 5,758, 965, and 5,779,359.

Rotating, levitating magnetic elements which levitate above a cold magnetized superconducting material can also be used to mix or pump fluids. Similar to bottom-mounted magnetically coupled mixers, levitating mixers include an agitator tank having within it an impeller assembly comprised of a plurality of blades, and a magnetic coupler which couples the impeller to a motor located at the exterior of the tank. Unlike bottom-mounted magnetically-coupled mixers, superconducting levitation technology allows the impeller assembly to "float" inside the tank without any mechanical support. Rather, the supporting force comes from superconducting material that "freezes" a magnetic field within which an impeller can be rotated but not moved horizontally or vertically (within the limits of the magnetic field). An example of such a device can be found in U.S. Pat. No. 5,416,215.

A drawback associated with current superconducting levitation mixers is that by nature of the fluid flow, the local pressure above the impeller is lower than the pressure below the impeller, thus producing a net upward force underneath the impeller. This force can become sufficiently strong to override the magnetic attraction to the superconducting magnets on the outside of, the vessel, leading to decoupling of the impeller.

Accordingly, it is desirable to provide a method and magnetically-coupled impeller apparatus for mixing or pumping fluids that is suitable for use beyond the small vessels and minor mixing duty typically associated with bottom-mounted magnetically-coupled mixers. It is also desirable to provide a method and magnetically-coupled impeller apparatus that minimizes impeller instability in superconducting levitation mixers.

SUMMARY OF THE INVENTION

The foregoing needs are met, to a great extent, by the present invention, wherein in one aspect a magnetically-coupled impeller apparatus is provided that generates a longitudinal, and preferably upward, fluid flow. Magnetically-coupled mixers with such impeller designs can be more suitable for use with larger vessels and/or heavier mixing duty than typically associated with the bottom-mounted magnetic mixers of U.S. Pat. Nos. 5,364,184, 5,378,062, 5,470,152, 5,758,965, and 5,779,359, each of which are herein incorporated by reference. Further, the upward longitudinal fluid flow generated by some impeller designs according to the present invention can produce a thrust reaction downward, counterbalancing the pressure field difference above and below impellers found in superconducting levitating mixers of the type described in U.S. Pat. No. 5,416,215, the disclosure of which is incorporated by reference herein.

In accordance with one embodiment of the present invention, a system for providing or mixing a fluid in a vessel is provided. The system includes an impeller apparatus having a magnetic element attached to at least one up-pumping impeller, a superconducting element for levitating the magnetic element, and a motive device for rotating said magnetic element. The up-pumping impeller apparatus is located-within an agitator tank, whereas the superconducting element and the motive device are located outside the agitator tank. In some embodiments, the motive device includes a motor which rotates a drive magnet when activated, the magnetic element includes a first, levitation magnet which is acted upon by the superconducting element, and also includes a second, driven magnet, which is magnetically coupled to the drive magnet.

In accordance with another embodiment of the present invention, a magnetically-coupled mixer is provided that includes an agitator tank fitted with an impeller apparatus rotated by a motive device. The impeller apparatus includes an axial-pumping impeller attached to a driven magnet by a drive shaft, and the motive device includes a motor and drive magnet magnetically coupled to the driven magnet.

In accordance with yet another embodiment of the present invention, a system for pumping or mixing a fluid in a vessel is provided, in which the system includes an impeller means, located in the vessel, for generating upward fluid, a driven magnet attached to the impeller means, and motive means magnetically coupled to the driven magnet for rotating the driven magnet. In some embodiments, the system also includes a magnetic element attached to the impeller means, and a superconducting element for levitating the magnetic element. In some embodiments the impeller means includes an up-pumping impeller attached to a drive shaft means for supporting the impeller inside the vessel, away from the walls of the vessel, and for rotating the impeller when actuated by rotation of the driven magnet.

In accordance with still another embodiment of the present invention, a method for generating upward longitudinal fluid flow in a magnetically-coupled mixer apparatus is provided, where the method includes rotating, in an agitator tank, an up-pumping impeller apparatus. The impeller apparatus includes an up-pumping impeller and a driven magnet attached to the impeller, and upward longitudinal fluid flow is generated by actuating a motor connected to a drive magnet which in turn is magnetically coupled to the driven magnet. According to the process, actuation of the motor rotates the drive magnet, in turn causing the driven magnet to rotate and therefore the impeller to rotate and generate upward fluid flow.

It should be understood that the terms "axial" and "longitudinal" are used interchangeably in the present application when referring to fluid flow, and is intended to be used consistent with the art-accepted definition, to mean flow that is generally parallel to the axis of rotation of the impeller. The related term, "axial-pumping," is used to denote that fluid is pumped or caused to flow in an axial (or longitudinal) direction. The term "up-pumping" is used to denote that fluid is pumped or caused to flow in an upward axial (or upward longitudinal) direction.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
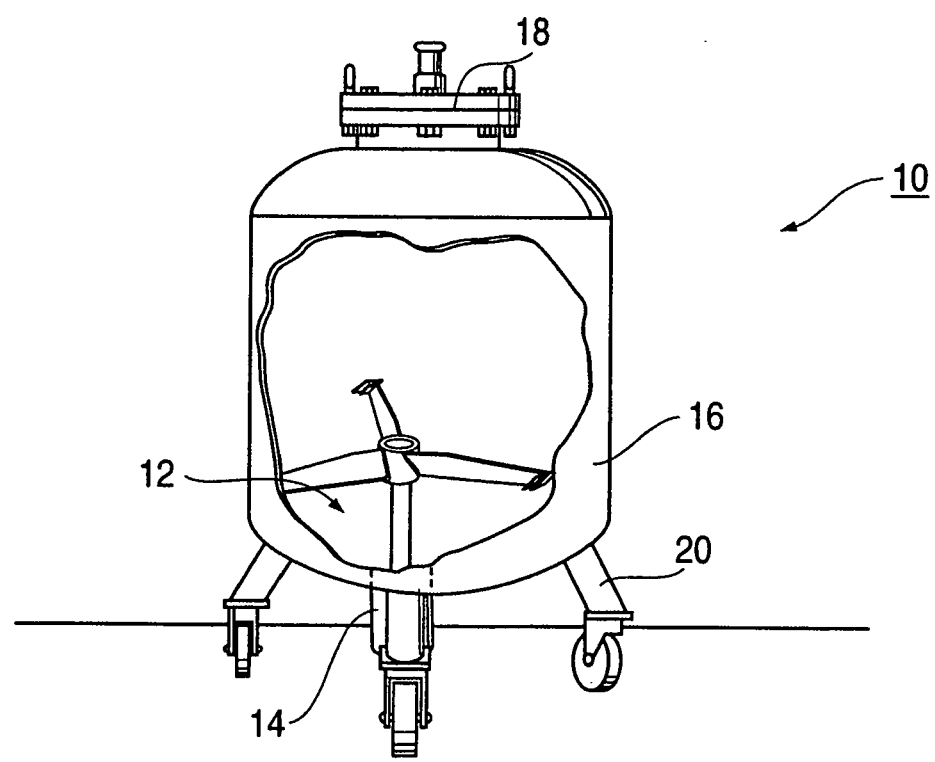
FIG. 1 is a perspective view illustrating a magnetically-coupled mixer according to a preferred embodiment of the invention.

The invention will now be described with reference to the drawing figures, in which like reference numerals refer to like parts throughout. A magnetically-coupled mixer having an axially-pumping impeller positioned away from the bottom of the tank is provided. Such mixers can provide fluid flow more compatible with larger vessels and/or heavier mixing duty than the fluid flow associated with the typical bottom-mounted mixers discussed above. Further, upward longitudinal flow generated in certain mixers according to the present invention can be more compatible with super-conducting levitating mixers in that the flow can produce a thrust reaction downward, counterbalancing the pressure field difference above and below impellers found in super-conducting levitating mixers of the type described in U.S. Pat. No. 5,416,215.

FIG. 1 illustrates a magnetically-coupled mixing or pumping system 10 ("the mixing system" 10) incorporating an impeller apparatus 12 in accordance with an embodiment of the present invention. The mixing system 10, in addition to the impeller apparatus 12, includes a motive device 14, and an agitator tank 16. The agitator tank 16, may be enclosed by a lid 18 and supported by a plurality of legs 20, as shown.

Figure 2:
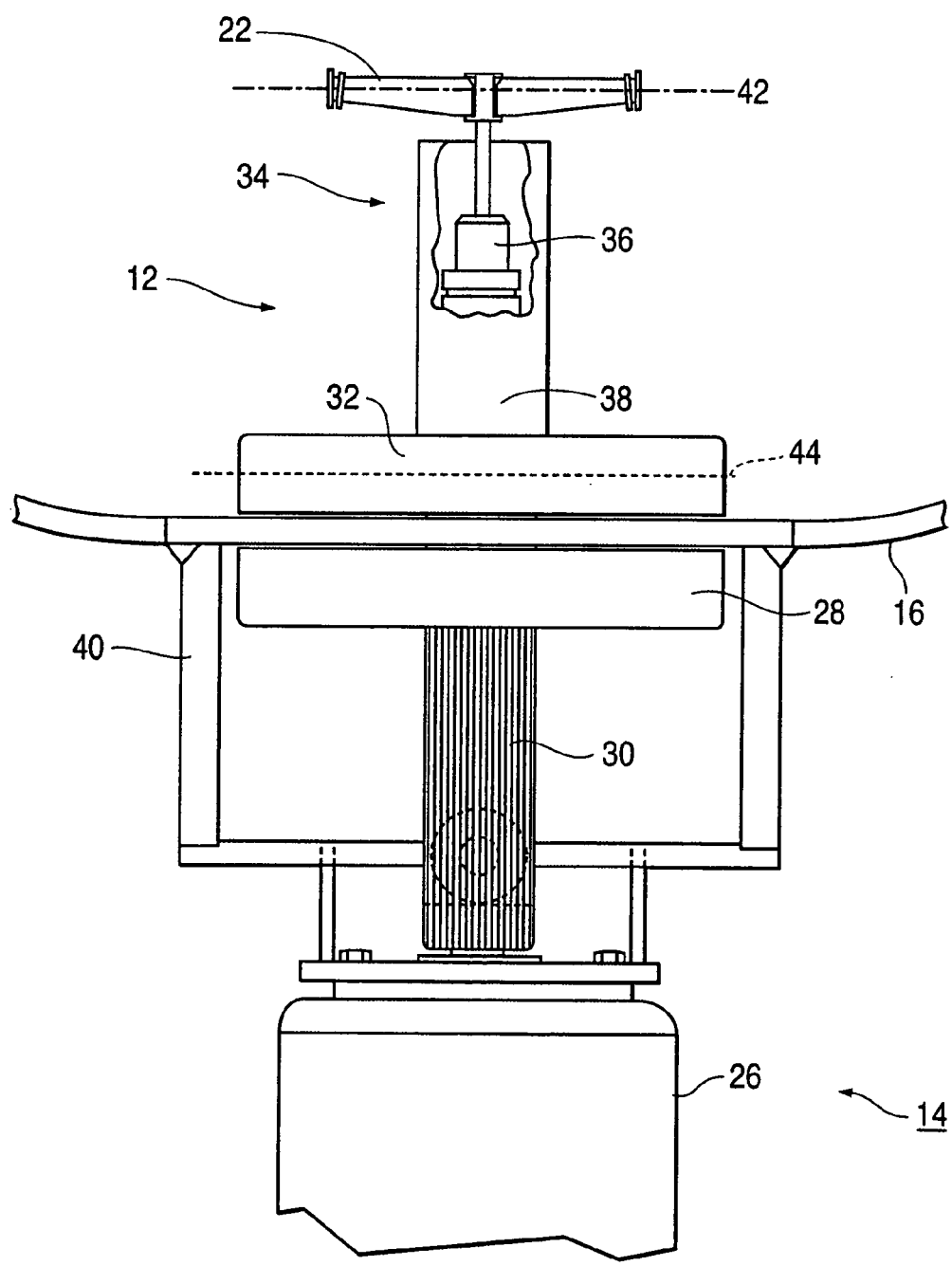
FIG. 2 is a cross-sectional view of the magnetically-coupled mixer of FIG. 1.

As shown in FIG. 2, the motive device 14 includes a motor 26 attached to a magnet chamber 40. The magnet chamber 40 connects to the exterior of the agitator tank 16 and houses a drive magnet 28 and a shaft 30 connecting the motor to the drive magnet 28.

Figure 3:
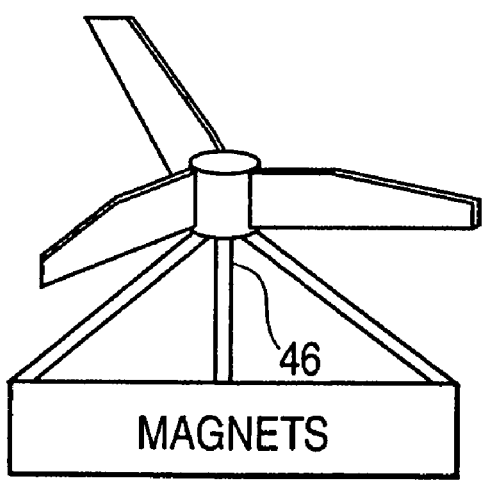
FIG. 3 is a is a close-up perspective view of an exemplary impeller and shaft suitable for use in the embodiment of FIG. 1.

The impeller apparatus 12 generally includes an axial-pumping impeller 22 attached to a driven magnet 32. The impeller 22 is supported by at least one post so that it is held away from the bottom of the tank 16. FIGS. 2 and 3 show different exemplary methods of supporting the impeller 22 in the tank 16. According to the embodiment of FIG. 2, the impeller 22 is attached via a post and bearing structure 34 to the driven magnet 32. The post and bearing structure 34 includes a sleeve 38 coaxial with a post 36, and which sleeve 38 can rotate around the post 36. The sleeve 38 is attached at one end to the driven magnet 32 and at the other end to the impeller 22. According to FIG. 3, the impeller 22 is supported by three separate posts 46. This particular embodiment can allow for a center hole in the driven magnet 32 to permit fluid flow underneath the impeller 22 and up through the center, which can be good for cleanability.

Figure 7:
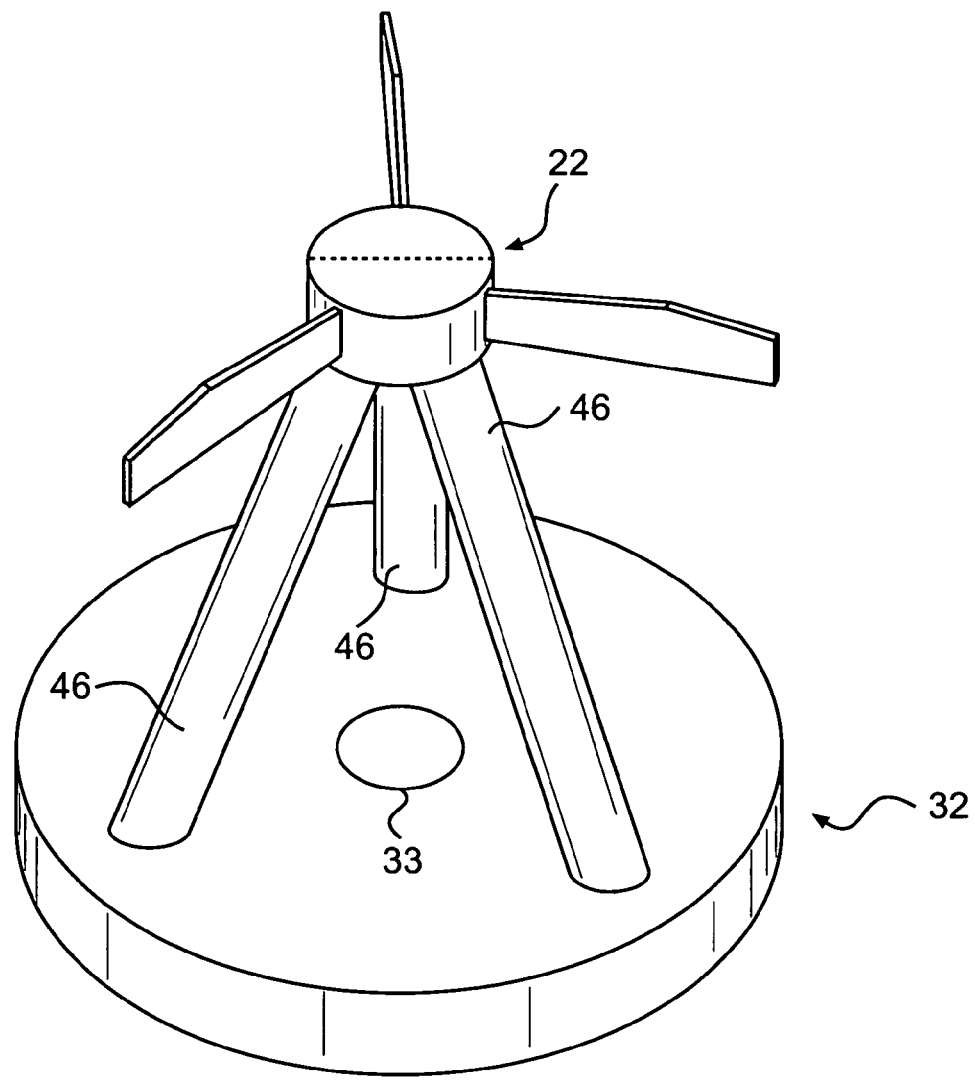
FIG. 7 is a perspective view of an impeller mounted to a driven magnet.

FIG. 7 depicts the embodiment having a center hole 33 in the driven magnet 32. A plurality of posts 46 support the impeller 22. Thus permitting fluid flow underneath the impeller 22 up through the center hole 33 without being blocked by the posts 46.

Independent of the method used to support the impeller 22 away from the bottom of the tank 16, preferably the impeller 22 is positioned along the support such that the distance between the horizontal centerline 42 of the impeller 22 and the horizontal centerline 44 of the driven magnet 32 is approximately 0.75 impeller diameters. The distance is' not critical, but a minimum distance should still allow fluid to flow under the impeller 22 during mixing. Further, the as the distance from the bottom increases, so too may instability due to weight and force increase.

Figure 5:
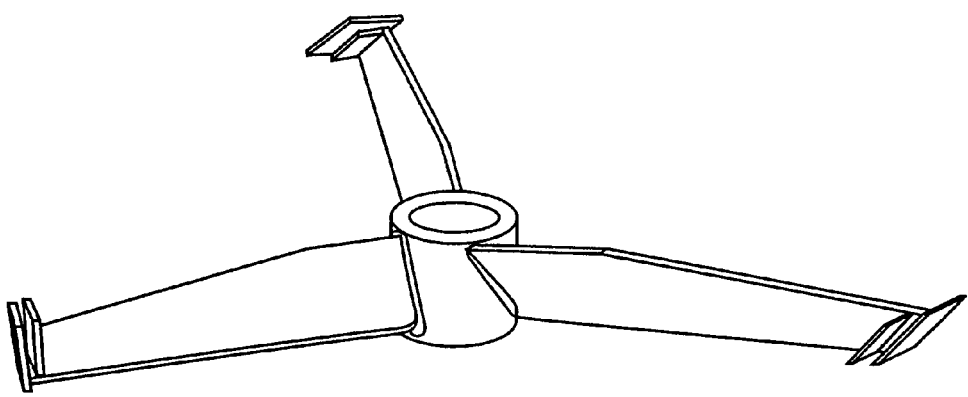
FIG. 5 is a perspective view of another axial-pumping impeller suitable for use with magnetically-coupled mixers according to the present invention.
Figure 6:
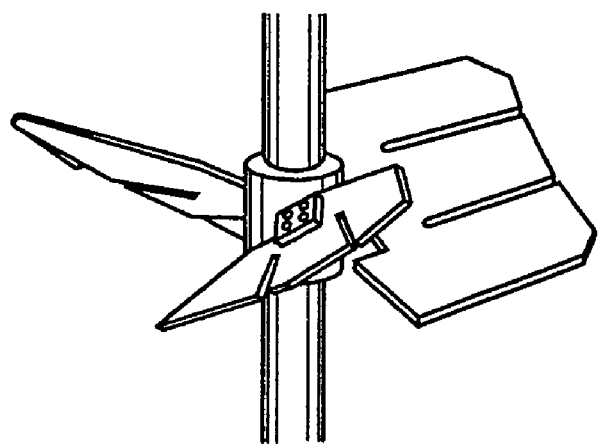
FIG. 6. is a perspective view of yet another axial-pumping impeller suitable for use with magnetically-coupled mixers according to the present invention.

The choice of impeller 22 is also not critical, but should preferably be an axial-pumping impeller and more preferably an up-pumping impeller. The axial-pumping impeller preferably has a diameter that is about 1.1 times the diameter of the driven magnet. Generally, the more axial the flow, the higher the net thrust in the down direction, which is of particular relevance for embodiments used with superconducting levitating magnet designs. FIGS. 5 and 6 illustrate additional exemplary axial-pumping impellers which can be used in accordance with the present invention.

The driven magnet 32 is located within the tank 16 so that it is magnetically-coupled to the drive magnet 28; consequently, rotating the drive magnet 28 causes the driven magnet 32 to rotate. Whereas the motive device 14 is located outside the tank 16, the impeller apparatus 12 is located within the inner cavity 24 of the tank 16. Activation of the motive device 14 rotates the drive magnet 28, causing the driven magnet 32 and therefore the impeller 12 to rotate, mixing the contents of the tank 16.

Figure 4:
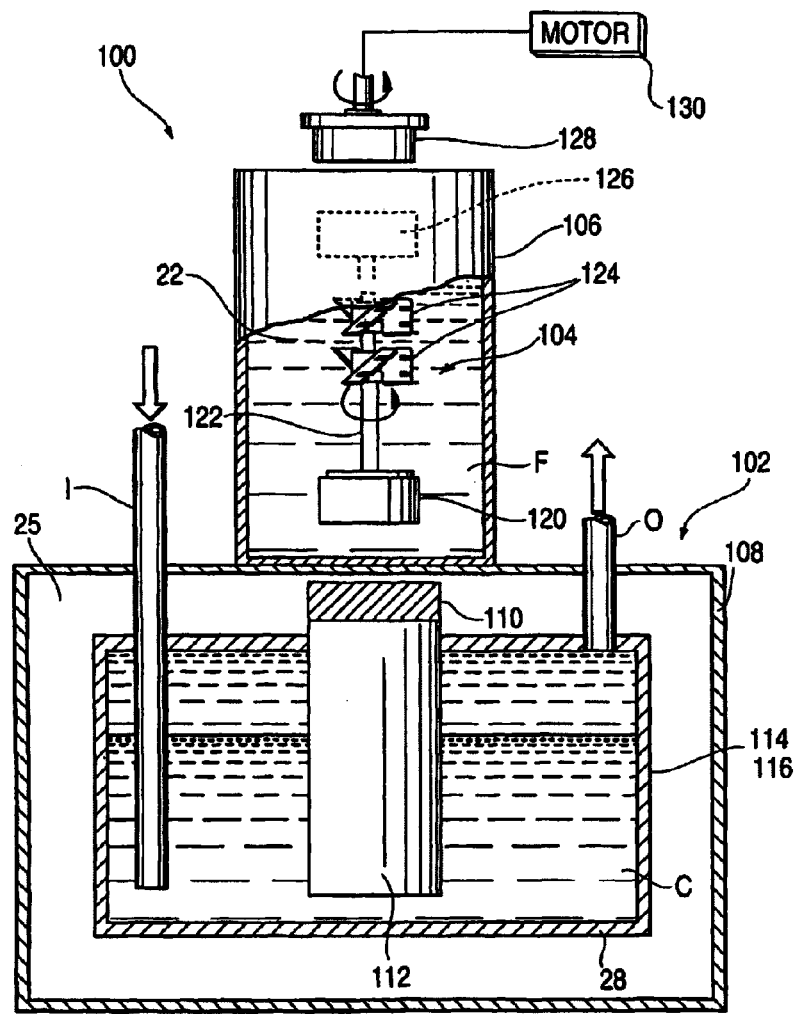
FIG. 4 is a partially cross-sectional, partially cutaway, partially schematic view of another embodiment of a magnetically-coupled mixer in accordance with the invention.

FIG. 4 is a schematic view of another embodiment of a magnetically-coupled mixer system 100 in accordance with the present invention. Whereas in the embodiment illustrated in FIG. 1, the impeller 22 is held away from the bottom of the tank 16 by a post and bearing structure 34, in the embodiment of FIG. 4, the impeller 22 is held away from the tank bottom by superconducting levitation technology.

In the embodiment illustrated, a cryostat 102 is used as the cooling source for the superconductor that produces the desired levitation in a magnetic pumping or mixing element 104, which is shown for the purposes of illustrate as a magnetic bearing 104. The magnetic element or bearing 104 is placed in a tank 106 positioned external to the cryostat 102.

As illustrated, the tank 106 rests atop the outer wall 108 of the cryostat 102. Positioned inside of the wall 108 is a superconducting element 110, which is supported by a rod 112 that provides the thermal link between the superconducting element 110 and a separate cooling source 114.

In the illustrated embodiment, the cooling source 114 is a separate, substantially contained cooling chamber 116 holding a cryogen C, such as liquid nitrogen. The chamber 116 is defined by an outer wall 118 that is substantially thermally separated from the outer wall 108 of the cryostat 102 to minimize heat transfer. An inlet I is provided through the outer wall 108 for introducing the cryogen into the cooling chamber 116. To permit any vapor to escape from the chamber 116 as the cryogen warms, an exhaust outlet O is also provided.

As is known in the art, by cooling the superconducting element 110 in the presence of a magnetic field, it becomes capable of distributing the current induced by a permanent magnet such that the magnet levitates a certain distance above the superconducting element, depending primarily upon the intensity and the direction of the magnetic filed generated by the levitating magnet. Although basically a repulsive force is created, the peculiar nature of the pinning forces generated actually tie the levitating magnet to the superconducting element as if the two were connected by an invisible spring.

The magnetic bearing 104 includes a first permanent magnet 120 for positioning in the tank 106 adjacent to the to the superconducting element 110 such that it levitates in the fluid. A support shaft 122 is connected to and extends from the first permanent magnet 120. Along the shaft 122, at least one up-pumping impeller 124 is carried that serves to provide the desired pumping or mixing action when the magnetic bearing 104 is rotated. Rotation of the magnetic bearing 104 is achieved by a magnetic coupling formed between a second permanent magnet 126 and a drive magnet 128 positioned externally of the tank 106. The drive magnet 128 is rotated by a drive means, such as an electric motor 130, and the magnetic coupling formed with the second permanent magnet 126 serves to transmit the driving torque to the bearing 104 to provide the desired pumping or mixing action.

It should be noted that as with the support structure of the embodiment shown in FIG. 1, the superconducting levitation technology illustrated is exemplary only and not limiting. For example, although in the embodiment illustrated two separate magnets are used, one for driving the impeller and another for levitating the impeller, a single magnet can also be used, which both rotates and levitates the impeller.

As with the embodiment of FIG. 1, the distance the impeller is supported away from the bottom of the tank and the choice of impeller itself is not critical. With respect to the distance from bottom, preferably the minimum distance should still allow fluid to flow under the impeller during mixing. Preferably, the impeller is preferably positioned along the support such that the distance between the horizontal centerline of the impeller and the horizontal centerline of the first permanent magnet is approximately 0.75 impeller diameters. The distance can be greater, but it should be appreciated that as the distance from the bottom increases, so too may instability due to weight and force increase.

With respect to the choice of impeller, for embodiments used with superconducting levitating technology, the impeller should preferably be an up-pumping impeller, and more preferably an axial-pumping impeller having a diameter that is about 1.1 times the diameter of the driven magnet. The choice of particular up-pumping impeller may depend on the given application, and the more axial the flow caused by the impeller, the higher the net thrust in the down direction. As indicated above, FIGS. 5 and 6 illustrate additional exemplary axial-pumping impellers which can be used in accordance with the present invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for pumping or mixing a fluid in a vessel, comprising:
   an impeller apparatus comprising a magnetic element having an open hole extending through the center of the disc, and attached to at least one up-pumping impeller by a plurality of posts attached around the open center hole of the element so as to allow flow to be urged by the impeller through the hole, the impeller apparatus being configured for placement in the vessel;
   a superconducting element for levitating said magnetic element; and,
   a motive device for rotating said magnetic element.

2. The system of claim 1, wherein the magnetic element comprises a first, levitation magnet and a second, driven magnet, said motive device comprises a drive magnet magnetically coupled to said second, driven magnet, and said superconducting element operates to levitate said first, levitation magnet.

3. The system of claim 1, wherein the magnetic element comprises a single magnet operably connected to both the superconductor element and the motive device.

4. The system of claim 1, wherein:
   the up-pumping impeller has a diameter;
   the magnetic element comprises a driven magnet having a width or diameter; and,
   the up-pumping impeller diameter is about 1.1 times the width or diameter of the drive magnet.

5. The system of claim 1, wherein:
   the up-pumping impeller has a horizontal centerline and a diameter;

the magnetic element has a horizontal centerline and a width or diameter; and, the up-pumping impeller is attached to the magnetic element by a post such that the up-pumping impeller horizontal centerline is located at a distance of about 0.75 impeller diameter from the magnetic element horizontal centerline.

6. The system of claim 5, wherein the up-pumping impeller diameter is about 1.1 times the width or diameter of the drive magnet.

7. The system of claim 1, wherein the up-pumping impeller includes three blades.

8. The apparatus of claim 1, wherein the posts include a first post, a second post, and a third post.

9. A magnetically-coupled mixer apparatus, comprising:
an agitator tank having an inner cavity and an exterior;
an impeller apparatus comprising an axial-pumping impeller axially-spaced driven magnet by a plurality of posts, the impeller apparatus being located within the inner cavity of said agitator tank, wherein the magnet has an open hole extending through the center of the magnet and the posts are attached around the open center hole of the magnet element so as to allow flow to be urged by the impeller through the hole, and
a motive device comprising a motor and a drive magnet for rotating said impeller apparatus, wherein the motive device is mounted to the exterior of the agitator tank and the drive magnet is magnetically coupled to the driven magnet.

10. The apparatus of claim 9, wherein:
the axial-pumping impeller has a diameter;
the magnetic element comprises a driven magnet having a width or diameter; and,
the axial-pumping impeller diameter is about 1.1 times the width or diameter of the drive magnet.

11. The apparatus of claim 9, wherein:
the axial-pumping impeller has a horizontal centerline and a diameter;
the magnetic element has a horizontal centerline and a width or diameter; and,
the axial-pumping impeller is attached to the magnetic element by a post such that the up-pumping impeller horizontal centerline is located at a distance of about 0.75 impeller diameter from the magnetic element horizontal centerline.

12. The apparatus of claim 11, wherein the axial-pumping impeller diameter is about 1.1 times the width or diameter of the drive magnet.

13. The apparatus of claim 11, wherein the axial-pumping impeller includes three blades.

14. The apparatus of claim 9, wherein the posts include a first post, a second post, and a third post.

15. A system for pumping or mixing a fluid in a vessel, comprising:
impeller means for generating upward fluid flow configured for placement in the vessel;
a driven magnet attached to said impeller means by a plurality of posts, wherein the magnet has an open hole extending through the center of the magnet and the posts are attached around the open center hole of the magnet element so as to allow flow to be urged by the impeller through the hole ; and
motive means for rotating said driven magnet, said motive means being magnetically coupled to said driven magnet.

16. The system of claim 15, further comprising a magnetic element attached to said impeller means by said posts, and a superconducting element for levitating said magnetic element.

17. The system of claim 15, wherein the vessel has walls, and said impeller means comprises an axial-pumping impeller attached to said posts for supporting the impeller in a location away from the vessel walls and for rotating the impeller when actuated by rotation of said driven magnet, and wherein said posts include a first post, a second post, and a third post.

18. A method for generating longitudinal fluid flow in a magnetically-coupled mixer apparatus, comprising:
rotating in an agitator tank an impeller apparatus comprising a driven magnet attached via a plurality of posts to an axial-pumping impeller by actuating a motor connected to a drive magnet, wherein the drive magnet is magnetically coupled to the driven magnet and
wherein the magnet has an open hole extending through the center of the magnet and posts are attached around the open center hole of the magnet, and
flowing fluid urged by the impeller through the center hole.

19. The method of claim 18, wherein:
the axial-pumping impeller has a diameter;
the magnetic element comprises a driven magnet having a width or diameter; and,
the axial-pumping impeller diameter is about 1.1 times the width or diameter of the drive magnet.

20. The method of claim 18, wherein:
the axial pumping impeller has a horizontal centerline and a diameter;
the magnetic element has a horizontal centerline and a width or diameter; and,
the axial-pumping impeller is attached to the magnetic element by a post such that the axial-pumping impeller horizontal centerline is located at a distance of about 0.75 impeller diameter from the magnetic element horizontal centerline.

21. A method for generating upward fluid flow in a superconducting
levitating magnetically-coupled mixer apparatus, comprising:
rotating in an agitator tank an upward pumping impeller apparatus by activating a motive device for rotating said impeller apparatus,
wherein the impeller apparatus comprises a magnetic element attached to at least one up-pumping impeller by a plurality of posts, wherein the magnet has an open hole extending through the center of the magnet and the posts are attached around the open center hole of the magnet, and the mixer apparatus comprises a superconducting element for levitating said magnetic element, and the motive device rotates, said magnetic element, and
flowing fluid urged by the impeller through the center hole.

22. A method according to claim 21, wherein:
the up-pumping impeller has a diameter;
the magnetic element comprises a driven magnet having a width or diameter; and,
the up-pumping impeller diameter is about 1.1 times the width or diameter of the drive magnet.

* * * * *